US012590377B2

(12) United States Patent
Sugawara

(10) Patent No.: US 12,590,377 B2
(45) Date of Patent: Mar. 31, 2026

(54) METHOD OF EXTRACTING PRECIPITATES AND/OR INCLUSIONS, METHOD OF QUANTITATIVELY ANALYZING PRECIPITATES AND/OR INCLUSIONS, AND ELECTROLYTE

(71) Applicant: JFE Steel Corporation, Tokyo (JP)

(72) Inventor: Seiya Sugawara, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 987 days.

(21) Appl. No.: 17/778,265

(22) PCT Filed: Nov. 18, 2020

(86) PCT No.: PCT/JP2020/042985
§ 371 (c)(1),
(2) Date: May 19, 2022

(87) PCT Pub. No.: WO2021/106711
PCT Pub. Date: Jun. 3, 2021

(65) Prior Publication Data
US 2022/0411947 A1 Dec. 29, 2022

(30) Foreign Application Priority Data
Nov. 25, 2019 (JP) ................................. 2019-211976

(51) Int. Cl.
*C25C 1/00* (2006.01)
*G01N 1/40* (2006.01)

(52) U.S. Cl.
CPC ............. *C25C 1/00* (2013.01); *G01N 1/4055* (2013.01); *G01N 1/4077* (2013.01); *G01N 2001/4061* (2013.01); *G01N 2001/4083* (2013.01)

(58) Field of Classification Search
CPC ...... C25C 1/00; G01N 1/4055; G01N 1/4077; G01N 2001/4061; G01N 2001/4083; G01N 1/405; G01N 2001/4088; G01N 33/2028; Y02P 10/20
See application file for complete search history.

(56) References Cited

U.S. PATENT DOCUMENTS

| | | | | |
|---|---|---|---|---|
| 4,111,767 A | * | 9/1978 | Kawagishi ................. | C25F 5/00 |
| | | | | 205/717 |
| 2006/0049091 A1 | * | 3/2006 | Cheetham ................. | C02F 9/20 |
| | | | | 210/283 |
| 2009/0139875 A1 | * | 6/2009 | Kim .......................... | C25F 3/02 |
| | | | | 205/684 |
| 2010/0206736 A1 | | 8/2010 | Ishida et al. | |
| 2010/0291692 A1 | * | 11/2010 | Kinoshiro ............ | G01N 33/202 |
| | | | | 205/790 |
| 2011/0240477 A1 | | 10/2011 | Kinoshiro et al. | |
| 2013/0004389 A1 | * | 1/2013 | Okamoto ............ | C22B 15/0008 |
| | | | | 423/26 |
| 2016/0245775 A1 | | 8/2016 | Eldershaw et al. | |
| 2020/0141023 A1 | * | 5/2020 | Mizukami ................. | C25F 3/06 |
| 2020/0141843 A1 | * | 5/2020 | Mizukami ................. | C25F 3/02 |

FOREIGN PATENT DOCUMENTS

| | | |
|---|---|---|
| CN | 102818723 A | 12/2012 |
| CN | 104034562 A | 9/2014 |
| CN | 105858779 A | 8/2016 |
| JP | 2000-137015 A | 5/2000 |
| JP | 2002-303620 A | 10/2002 |
| JP | 2007-127454 A | 5/2007 |
| JP | 2009-31269 A | 2/2009 |
| JP | 2009-31270 A | 2/2009 |
| JP | 2010-127789 A | 6/2010 |
| JP | 2010-127791 A | 6/2010 |
| JP | 2010-151695 A | 7/2010 |
| JP | 2016-151574 A | 8/2016 |
| JP | 2019-39029 A | 3/2019 |
| JP | 2019101002 A * | 6/2019 |
| JP | 2019-135469 A | 8/2019 |
| WO | 2017/142084 A1 | 8/2017 |
| WO | 2017/142088 A1 | 8/2017 |

OTHER PUBLICATIONS

Machine Translation of JP2019101002A.*
Office Action dated Apr. 23, 2025, from counterpart Korean Patent Application No. 10-2022-7016848, along with a Search Report in English.
Extended European Search Report dated Dec. 21, 2022, of counterpart European Patent Application No. 20892357.3.
European Office Action dated Nov. 13, 2024, from counterpart European Patent Application No. 20892357.3.
Office Action dated Jan. 13, 2025, of counterpart Chinese Patent Application No. 202080080469.4, along with a Search Report in English.
International Search Report dated Jan. 26, 2021 in counterpart International Application No. PCT/JP2020/042985.
Written Opinion dated Jan. 26, 2021 in counterpart International Application No. PCT/JP2020/042985.

* cited by examiner

*Primary Examiner* — Bryan D. Ripa
(74) *Attorney, Agent, or Firm* — DLA Piper LLP (US)

(57) ABSTRACT

A precipitate and/or an inclusion in a metal material are extracted by electrolysis using an electrolyte solution. The electrolyte solution contains an adsorbent physically adsorbed and/or chemically adsorbed to any metal other than a matrix metal of the metal material. The extracted precipitate and/or inclusion can be quantitatively analyzed with high accuracy.

19 Claims, 1 Drawing Sheet

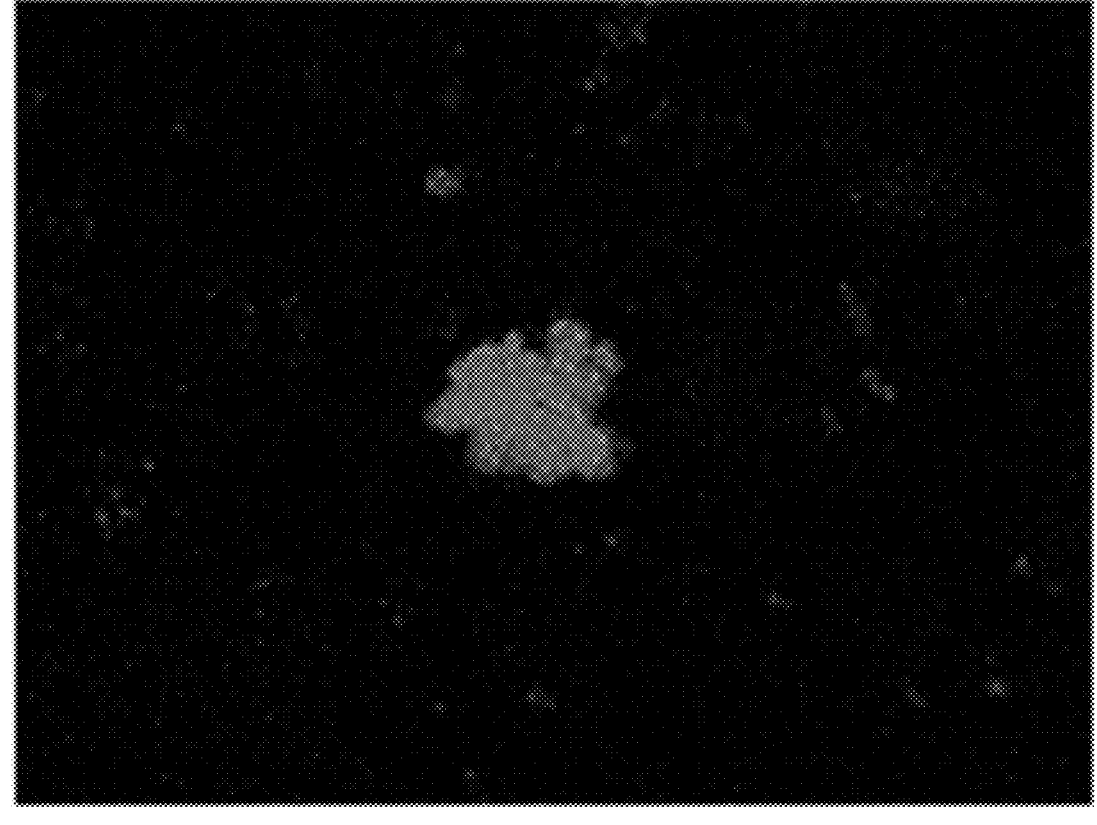
2.5μm

METHOD OF EXTRACTING PRECIPITATES AND/OR INCLUSIONS, METHOD OF QUANTITATIVELY ANALYZING PRECIPITATES AND/OR INCLUSIONS, AND ELECTROLYTE

TECHNICAL FIELD

This disclosure relates to a method of extracting a precipitate and/or an inclusion, a method of quantitative analysis of a precipitate and/or an inclusion, and an electrolyte solution.

BACKGROUND

A precipitate and/or an inclusion (hereinafter, also referred to as "precipitate and the like") present in a metal material, depending on their abundance, has a significant influence on properties (for example, fatigue properties, hot workability, cold workability, deep drawability, machinability, electromagnetic properties and the like) of the metal material.

In particular, when the metal material is a steel material, a technique to improve properties of the steel material using a trace amount of a precipitate and a technique to control the form of an inclusion have been remarkably developed in recent years.

Accordingly, the precipitate and the like are strictly controlled in a process of producing the steel material. For this purpose, it is necessary to quantitatively analyze the precipitate and the like with high accuracy.

In general, to quantitatively analyze the precipitate and the like in the metal material, first, the precipitate and the like are extracted. Thereafter, the extracted precipitate and the like are collected by filtration using a filter and subjected to quantitative analysis.

Methods of extracting the precipitate and the like can be roughly classified into an acid dissolution method, a halogen method, and an electrolytic dissolution method.

Among those methods, an electrolytic dissolution method (see JP 2010-151695 A) of extracting the precipitate and the like in the metal material by electrolysis is often used because the precipitate and the like can be stably extracted.

When the precipitate and the like in the metal material are extracted by electrolysis (electro extraction) and the extracted precipitate and the like are quantitatively analyzed, the resulting quantitative analysis value may greatly deviate from an expected value.

It could therefore be helpful to provide a method of extracting a precipitate and/or an inclusion (precipitate and the like), which method enables accurate quantitative analysis of the extracted precipitate and the like.

Furthermore, it could be helpful to provide a method of quantitative analysis of a precipitate and the like using the extracting method, and an electrolyte solution used in the extracting method.

SUMMARY

I thus provide [1] to [11]:

[1] A method of extracting a precipitate and/or an inclusion, comprising extracting the precipitate and/or the inclusion in a metal material by electrolysis using an electrolyte solution, wherein the electrolyte solution contains an adsorbent that is physically adsorbed and/or chemically adsorbed to any metal other than a matrix metal of the metal material.

[2] The method of extracting a precipitate and/or an inclusion according to [1], wherein the electrolyte solution contains a solvent, and a specific gravity of the adsorbent is larger than a specific gravity of the solvent.

[3] The method of extracting a precipitate and/or an inclusion according to [1] or [2], wherein the electrolyte solution contains an agent that forms a complex with the matrix metal.

[4] The method of extracting a precipitate and/or an inclusion according to any one of [1] to [3], wherein the metal material is a steel material.

[5] The method of extracting a precipitate and/or an inclusion according to [4], wherein the any metal is Cu.

[6] A method of quantitative analysis of a precipitate and/or an inclusion, comprising quantitatively analyzing the precipitate and/or the inclusion extracted by the extracting method according to any one of [1] to [5].

[7] An electrolyte solution for extracting a precipitate and/or an inclusion in a metal material by electrolysis, the electrolyte solution comprising an adsorbent that is physically adsorbed and/or chemically adsorbed to any metal other than a matrix metal of the metal material.

[8] The electrolyte solution according to [7], comprising an agent that forms a complex with the matrix metal.

[9] The electrolyte solution according to [7] or [8], comprising a solvent, wherein a specific gravity of the adsorbent is larger than a specific gravity of the solvent.

[10] The electrolyte solution according to any one of [7] to [9], wherein the metal material is a steel material.

[11] The electrolyte solution according to [10], wherein the any metal is Cu.

Thus, an extracted precipitate and the like can be quantitatively analyzed with high accuracy.

BRIEF DESCRIPTION OF THE DRAWING

The Drawing is a characteristic X-ray image of Cu such as a precipitate in Comparative Example 1.

DETAILED DESCRIPTION

As described above, when a precipitate and the like in a metal material are extracted by electrolysis (electro extraction) and the extracted precipitate and the like are quantitatively analyzed, the resulting quantitative analysis value may greatly deviate from an expected value.

Specifically, for example, when a steel material is electrolyzed to extract precipitates such as $CuS$, $Cu_2S$, $(Mn, Cu)S$, and $MnS$, an error in the quantitative analysis value thereof may occur.

To clarify its cause, I analyzed a composition of a steel material before electrolysis and electrolytic residues containing a precipitate and the like extracted by electrolysis using a scanning electron microscope (SEM) and a transmission electron microscope (TEM).

I found that the electrolytic residues often contain metal Cu particles as shown in the Drawing mixed in the extracted precipitate and the like, which metal Cu particles are not observed in the steel material.

I thus consider a phenomenon in which the metal Cu particles not present in the steel material are present in the electrolytic residues.

From the observation results obtained with SEM and TEM, I estimated that Cu is present in a solid solution state in the steel material. When the steel material is electrolyzed, Cu is eluted into an electrolyte solution together with Fe which is a matrix metal of the steel material.

At this time, when solubility of Cu in the electrolyte solution is not high and the solubility is exceeded, Cu is precipitated and further aggregated to form nano-sized metal Cu particles. The nano-sized metal Cu particles have high surface energy. Thus, the formed metal Cu particles adhere to a surface of the steel material, as the electrolytic residues, are mixed with a precipitate and the like, which are original analysis targets, and are extracted. Thus, an error in the quantitative analysis value occurs.

I then electrolyzed the steel material using an electrolyte solution containing an adsorbent that selectively adsorbs (physically adsorbs and/or chemically adsorbs) to metal Cu, i.e., a cause of an error.

As a result, adhesion of the metal Cu particles to the surface of the steel material could be inhibited, and accuracy of quantitative analysis of the precipitate and the like improved.

Hereinafter, an example of my methods and electrolytes will be described.

The "metal material" is not particularly limited, and examples thereof include steel materials such as a hot-rolled steel sheet and a cold-rolled steel sheet.

The "matrix metal" of the metal material is an element contained most in the metal material, and is, for example, Fe when the metal material is a steel material.

"Any metal" other than the matrix metal of the metal material is a metal that causes the error described above, and is hereinafter also referred to as the "interfering metal." The interfering metal is not particularly limited and, for example, when the metal material is a steel material, Cu or the like can be exemplified.

The "precipitate and/or inclusion" (precipitate and the like) in the metal material is not particularly limited, and examples thereof include CuS, $Cu_2S$, (Mn, Cu)S, and MnS when the metal material is a steel material.

The electrolyte solution is an electrolyte solution that extracts a precipitate and/or an inclusion in a metal material by electrolysis, and contains an adsorbent that is physically adsorbed and/or chemically adsorbed to any metal other than the matrix metal of the metal material.

The electrolyte solution substantially contains an electrolyte.

The electrolyte is not particularly limited, a conventionally known electrolyte can be used, and examples thereof include tetramethylammonium chloride, sodium chloride, and potassium bromide.

The electrolyte solution substantially contains a solvent.

The solvent is not particularly limited, and a solvent of a conventionally known electrolyte solution can be used, and examples thereof include a nonaqueous solvent and an aqueous solvent (water). Examples of the nonaqueous solvent suitably include nonaqueous solvents having a hydroxy group such as methanol, ethanol, propanol, and butanol.

Agent

The electrolyte solution preferably contains an agent that forms a complex with the matrix metal of the metal material (hereinafter, the "agent"). With this constitution, re-adhesion and re-precipitation of the matrix metal dissolved in the electrolyte solution on the surface of the metal material are suppressed.

The agent is not particularly limited, and examples thereof suitably include acetylacetone, salicylic acid, methyl salicylate, maleic acid, citric acid, and sodium citrate.

The content of the agent is not particularly limited, and is preferably 1% or more, more preferably 5% or more, still more preferably 10% or more in terms of a mass ratio with respect to the solvent since it is necessary to form a complex with the matrix metal.

On the other hand, from the viewpoint of economic rationality, environmental load and the like, the content of the agent is preferably 50% or less, more preferably 30% or less in terms of a mass ratio with respect to the solvent.

Base Electrolyte Solution

The electrolyte solution is preferably composed mainly of a base electrolyte solution.

The base electrolyte solution contains at least the above-described electrolyte and solvent, and may further contain the above-described agent.

The base electrolyte solution is not particularly limited, and examples thereof include nonaqueous solvent electrolyte solutions such as an AA (acetylacetone-tetramethylammonium chloride-methanol) electrolyte solution, an MS (methyl salicylate-salicylic acid-tetramethylammonium chloride-methanol) electrolyte solution, or an MA (maleic anhydride-tetramethylammonium chloride-methanol) electrolyte solution; and water-solvent-based electrolyte solutions such as citric acid electrolyte solution and hydrochloric acid electrolyte solution.

Adsorbent

The adsorbent contained in the electrolyte solution is a substance that is physically adsorbed and/or chemically adsorbed to the interfering metal. Physical adsorption is adsorption by van der Waals forces. Chemical adsorption is adsorption by chemical bonding.

Adsorption (physical adsorption and/or chemical adsorption) of the adsorbent to the matrix metal is not excluded. That is, the adsorbent may be adsorb not only to the interfering metal (any metal other than the matrix metal of the metal material) but also to the matrix metal of the metal material.

Examples of the adsorbent (hereinafter, the "physical adsorbent") that is at least physically adsorbed to the interfering metal include porous materials such as activated carbon, silica, activated alumina, synthetic zeolite, and porous organic compounds.

As the adsorbent (hereinafter, the "chemical adsorbent") that is at least chemically adsorbed to the interfering metal, a compound having a functional group that specifically coordinates to the interfering metal is preferable. Specific examples of the chemical adsorbent suitably include silica having a thiol group (—SH group) when the interfering metal is Cu.

The specific gravity of the adsorbent is preferably larger than the specific gravity of the solvent.

As described later, the metal material is taken out from the electrolyte solution after electrolysis. At that time, because the adsorbent is precipitated and hardly adheres to the metal material, the specific gravity of the adsorbent is preferably larger than the specific gravity of the solvent.

The pore size of the adsorbent (in particular, physical adsorbent) is preferably 100 nm or less in diameter, and more preferably 50 nm or less in diameter from the viewpoint of adsorption capacity. On the other hand, the pore size is preferably 0.5 nm or more in diameter, and more preferably 1 nm or more in diameter.

The pore size of the adsorbent is determined by measurement using a gas adsorption method.

An average particle size of the adsorbent is preferably small because the adsorbent is easily dispersed in the electrolyte solution.

However, as described later, the adsorbent may be filtered using a filter. In this example, the average particle size of the adsorbent is preferably more than a pore size of the filter and, specifically, more preferably 3 μm or more, still more preferably 5 μm or more. In this example, the upper limit is not particularly limited, and is, for example, 300 μm or less, preferably 250 μm or less.

The average particle size of the adsorbent is determined by measurement using a laser diffraction/scattering method.

The content of the adsorbent in the electrolyte solution is not particularly limited, and is preferably 0.01 g or more, more preferably 0.1 g or more with respect to 100 mL of the base electrolyte solution from the viewpoint of facilitating contact of the adsorbent with the interfering metal.

On the other hand, from the viewpoint of improving workability, the content of the adsorbent in the electrolyte solution is preferably 5 g or less, and more preferably 1 g or less, with respect to 100 mL of the base electrolyte solution.

Extracting Method

A method of extracting a precipitate and/or an inclusion (hereinafter, the extracting method) is a method of extracting a precipitate and/or an inclusion in a metal material by electrolysis using an electrolyte solution, and in the method of extracting a precipitate and/or an inclusion, the electrolyte solution contains an adsorbent that is physically adsorbed and/or chemically adsorbed to any metal other than the matrix metal of the metal material.

The electrolyte solution described above is an electrolyte solution used in the extracting method.

Preparation of Test Sample

In my extracting method, it is preferable that the metal material is first cut into a test piece having an appropriate size, and subjected to polishing, cleaning, drying and the like. Hereinafter, the test piece of the metal material having been subjected to polishing and the like is also referred to as a "test sample."

When a precipitate and the like are quantitatively analyzed, it is preferable to measure a mass of the test sample before electrolysis.

Electrolysis

Next, using my electrolyte solution, electrolysis (constant potential electrolysis or constant current electrolysis) is performed using the test sample as an anode.

A mass of the test sample electrolyzed is not particularly limited, and usually about 0.1 to 1 g of the test sample is electrolyzed. The mass of the test sample electrolyzed can be appropriately adjusted based on the amount of the electrolyte solution, the electrolysis conditions, the type of the test sample (metal material), the estimated value of the amount of precipitates and the like.

During electrolysis, it is preferable to stir the electrolyte solution using a magnetic stirrer or the like. As a result, precipitation of the adsorbent is suppressed, and the adsorbent is uniformly dispersed in the electrolyte solution and easily comes into contact with the interfering metal.

During electrolysis, the precipitate and the like contained in the test sample adheres as electrolytic residues to a surface of the test sample without being eluted in the electrolyte solution.

On the other hand, the interfering metal is eluted in the electrolyte solution, and is captured by the adsorbent. Thus, adhesion of the interfering metal to the test sample can be suppressed.

Separation of Precipitate and the Like

After a predetermined amount of electrolysis, a remaining part of the test sample is gently taken out from the electrolyte solution and immediately immersed in a dispersion liquid to not allow electrolytic residues (precipitate and the like) to adhere to the remaining part of the test sample to fall into the electrolyte solution.

Since the remaining part of the test sample is immersed in the dispersion liquid, electrolytic residues (precipitate and the like) adhering to the remaining part of the test sample is separated from the remaining part of the test sample and dispersed in the dispersion liquid.

The dispersion liquid is not particularly limited, a conventionally known dispersion liquid can be used, and examples of the dispersion liquid include methanol.

To rapidly separate the entire amount of precipitates and the like from the remaining part of the test sample, it is preferable to ultrasonically shake the dispersion liquid in which the remaining part of the test sample is immersed.

When the entire amount of precipitates and the like is separated from the remaining part of the test sample, the remaining part of the test sample exhibits metallic luster, and thus the metallic luster is used as a guide for an ultrasonic shaking time.

Thereafter, the remaining part of the test sample is taken out from the dispersion liquid. The remaining part of the test sample thus taken out is preferably sufficiently washed with methanol and the like and dried.

When the precipitate and the like are quantitatively analyzed, the mass of the remaining part of the test sample thus dried is measured and subtracted from the mass of the test sample before electrolysis to determine a mass of the test sample electrolyzed.

In one separation step (immersion and preferably ultrasonic shaking), the remaining part of the test sample may not exhibit metallic luster in some instances.

Specifically, for example, that when the precipitate and the like cannot be separated in one separation step because of a large amount of precipitates and the like, and it is assumed that the precipitate and the like remain on a surface of the remaining part of the test sample.

In this example, it is preferable to separately prepare a dispersion liquid and repeat the separation step a plurality of times until the remaining part of the test sample exhibits metallic luster.

Collection of Precipitate and the Like

The dispersion liquid from which the remaining part of the test sample is taken out (dispersion liquid in which the precipitate and the like are dispersed) is filtered (for example, vacuum filtration) using a filter to collect the precipitate and the like on the filter.

Among the precipitate and the like, those not larger than several tens of nanometers are likely to aggregate. Thus, the pore size of the filter used to collect the precipitate and the like does not need to be equal to or smaller than an assumed size of the precipitate and the like, and may be selected according to the average particle size of the precipitate and the like.

Prior to filtration to collect the precipitate and the like, it is preferable to filter the dispersion liquid in advance using a filter having a pore size of about 5 μm. Owing to this process, since the adsorbent (the adsorbent that was unavoidably adhering to the test sample and therefore dispersed in the dispersion liquid in the separation step) can be removed, the accuracy of quantitative analysis is excellent.

Quantitative Analysis Method

A method of quantitative analysis of a precipitate and/or an inclusion is a method of quantitative analysis of a precipitate and/or an inclusion, in which the precipitate and/or the inclusion extracted by my extracting method described above are quantitatively analyzed.

In the quantitative analysis method, it is preferable that the precipitate and the like extracted by my extracting method described above are dissolved according to a standard method and quantitatively analyzed.

For the dissolution of the precipitate and the like, a conventionally known acid aqueous solution or alkali aqueous solution can be used, and is appropriately selected according to a target element to be quantitatively analyzed.

Examples of the quantitative analysis method suitably include inductively coupled plasma atomic emission spectrometry (ICP-AES), inductively coupled plasma mass spectrometry (ICP-MS), and atomic absorption spectrometry.

EXAMPLES

Hereinafter, my methods and electrolyte solutions will be specifically described with reference to Examples. However, this disclosure is not limited to the Examples described below.

Example 1

In Example 1, a precipitate and the like in a test sample were extracted and quantitatively analyzed using an electrolyte solution A described later. Details thereof are described below.

Preparation of Test Sample

A steel ingot having a chemical composition (the balance being Fe and inevitable impurities) shown in Table 1 below was produced by vacuum melting. The produced steel ingot was heated to 1200° C. and then hot-rolled to produce a hot-rolled steel sheet having a thickness of 3 mm.

A sample for cross-section observation was collected from the produced hot-rolled steel sheet. When the collected sample was observed using an SEM, I confirmed that all precipitates and the like were MnS.

Next, a test piece having a size of 30 mm×30 mm was collected from the produced hot-rolled steel sheet, and the surface was polished to obtain a test sample.

Electro Extraction

The electrolyte solution A was prepared by adding 0.1 g of silica having a thiol group (R-Cat-Sil MP, produced by KANTO KAGAKU, average particle size: 5 μm) as an adsorbent (chemical adsorbent) to 100 mL of a citric acid electrolyte solution (10 mass % sodium citrate-1 mass % potassium bromide-pure water; the pH being adjusted to 4 using citric acid, the same applies hereinafter).

Using the prepared electrolyte solution A, a test sample was subjected to constant current electrolysis under the condition of a current density of 20 mA/cm².

After 0.1 g of the test sample was electrolyzed, the remaining part of the test sample taken out from the electrolyte solution A was immersed in methanol as a dispersion liquid, ultrasonic shaking was applied to it for 2 minutes, and it was confirmed that metallic luster appeared in the remaining part of the test sample. In this manner, the precipitate and the like adhering to the remaining part of the test sample were separated and dispersed in the dispersion liquid. Thereafter, the remaining part of the test sample was taken out from the dispersion liquid.

Next, the dispersion liquid from which the remaining part of the test sample was taken out was filtered through a filter having a pore size of 5 μm to remove the adsorbent. In addition, a filtrate was filtered through a filter having a pore size of 0.2 μm, and the precipitate and the like were collected on the filter.

Quantitative Analysis

The collected precipitate and the like were put in a beaker together with the filter, 20 mL of nitric acid was added thereto, and they were heated at 100° C. for 30 minutes to dissolve the precipitate and the like. After heating, the filter was taken out from the beaker, and nitric acid adhering to the filter was washed away with pure water.

The liquid in the beaker was quantitatively analyzed using an ICP emission spectrometer (ICPS-8100, manufactured by Shimadzu Corporation) to determine an amount of Cu (unit: mass %) of the precipitate and the like collected on the filter.

The electro extraction and the quantitative analysis described above were repeated three times, and an average value of three times was taken as the Cu amount. The smaller Cu amount can be evaluated as the better accuracy of quantitative analysis.

In addition, a standard deviation (unit: mass %) of the Cu amount in the three times repetition was determined. The smaller value of the standard deviation can be evaluated as the better accuracy of quantitative analysis.

The results are shown in Table 2 below.

Example 2

An electrolyte solution B was prepared by adding 5.0 g of activated carbon (activated carbon, produced by FUJIFILM Wako Pure Chemical Corporation, average particle size: 30 to 150 μm) having a pore size of 1 to 50 nm in diameter as an adsorbent (physical adsorbent) to 100 mL of a citric acid electrolyte solution.

The electro extraction and the quantitative analysis were performed in the same manner as in Example 1 except that the electrolyte solution B was used instead of the electrolyte solution A. The result is shown in Table 2 below.

Meanwhile, in Example 2, since the adsorbent was larger in particle size and specific gravity than a solvent of the electrolyte solution B and was likely to precipitate, the electrolyte solution B was stirred at a rotation speed of 200 rpm using a magnetic stirrer during electrolysis.

Comparative Example 1

100 mL of a citric acid electrolyte solution was used as an electrolyte solution C without adding an adsorbent.

The electro extraction and the quantitative analysis were performed in the same manner as in Example 1 except that the electrolyte solution C was used instead of the electrolyte solution A. The result is shown in Table 2 below.

Meanwhile, in Comparative Example 1, after electrolysis, the dispersion liquid from which the remaining part of the test sample was taken out was not filtered through a filter having a pore size of 5 μm (the adsorbent was not removed) but filtered through a filter having a pore size of 0.2 μm to collect the precipitate and the like on the filter.

TABLE 1

| Chemical composition [mass %] | | | | | |
|---|---|---|---|---|---|
| C | Si | Mn | P | S | Cu |
| 0.396 | 0.106 | 1.607 | 0.031 | 0.021 | 0.112 |

TABLE 2

| | Electrolyte solution | Cu amount [mass %] | Standard deviation [mass %] |
|---|---|---|---|
| Example 1 | A | 0.0073 | 0.0003 |
| Example 2 | B | 0.0025 | 0.0010 |
| Comparative Example 1 | C | 0.0304 | 0.0094 |

Summary of Evaluation Results

As shown in Table 2 above, it can be seen that Examples 1 and 2 have a smaller Cu amount of the precipitate and the like and a smaller standard deviation value than those of Comparative Example 1, and are excellent in quantitative analysis accuracy.

A comparison between Examples 1 and 2 shows that Example 2 using the electrolyte solution B had better accuracy of quantitative analysis than that of Example 1 using the electrolyte solution A.

The precipitate and the like collected on the filter in Comparative Example 1 were subjected to elemental analysis using an X-ray analyzer attached to an SEM to obtain a characteristic X-ray image of Cu.

The Drawing is the characteristic X-ray image of Cu of the precipitate and the like in Comparative Example 1. As shown in the Drawing, in Comparative Example 1, metal Cu particles were present while being mixed with the precipitate and the like.

The invention claimed is:

1. An electrolyte solution that extracts a precipitate and/or an inclusion in a metal material by electrolysis, the electrolyte solution comprising an adsorbent that is physically adsorbed and/or chemically adsorbed to any metal other than a matrix metal of the metal material, wherein the adsorbent that is physically adsorbed is a porous material, wherein the porous material is an activated carbon, a silica, an activated alumina, a synthetic zeolite, or a porous organic compound, and wherein the adsorbent that is chemically adsorbed is a silica having a thiol group.

2. The electrolyte solution according to claim 1, further comprising an agent that forms a complex with the matrix metal.

3. The electrolyte solution according to claim 2, further comprising a solvent, wherein a specific gravity of the adsorbent is larger than a specific gravity of the solvent.

4. The electrolyte solution according to claim 1, comprising a solvent, wherein a specific gravity of the adsorbent is larger than a specific gravity of the solvent.

5. The electrolyte solution according to claim 1, wherein the metal material is a steel material.

6. The electrolyte solution according to claim 1, wherein the any metal is Cu.

7. A method of extracting a precipitate and/or an inclusion, comprising extracting the precipitate and/or the inclusion in a metal material by electrolysis using an electrolyte solution, wherein the electrolyte solution contains an adsorbent physically adsorbed and/or chemically adsorbed to any metal other than a matrix metal of the metal material, wherein the adsorbent that is physically adsorbed is a porous material, wherein the porous material is an activated carbon, a silica, an activated alumina, a synthetic zeolite, or a porous organic compound, and wherein the adsorbent that is chemically adsorbed is a silica having a thiol group.

8. The method according to claim 7, wherein the electrolyte solution contains a solvent, and a specific gravity of the adsorbent is larger than a specific gravity of the solvent.

9. The method according to claim 8, wherein the electrolyte solution contains an agent that forms a complex with the matrix metal.

10. The method according to claim 9, wherein the metal material is a steel material.

11. The method according to claim 10, wherein the any metal is Cu.

12. The method according to claim 8, wherein the metal material is a steel material.

13. The method according to claim 12, wherein the any metal is Cu.

14. The method according to claim 7, wherein the electrolyte solution contains an agent that forms a complex with the matrix metal.

15. The method according to claim 14, wherein the metal material is a steel material.

16. The method according to claim 15, wherein the any metal is Cu.

17. The method according to claim 7, wherein the metal material is a steel material.

18. The method according to claim 7, wherein the any metal is Cu.

19. A method of quantitative analysis of a precipitate and/or an inclusion, comprising quantitatively analyzing the precipitate and/or the inclusion extracted by the extracting method according to claim 7.

* * * * *